United States Patent
Evans

(10) Patent No.: US 6,240,246 B1
(45) Date of Patent: May 29, 2001

(54) ANTI-RESONANCE MIXING FILTER

(75) Inventor: Paul S. Evans, Mesa, AZ (US)

(73) Assignee: AlliedSignal, Inc., Morris Township, NJ (US)

( * ) Notice: Subject to any disclaimer, the term of this patent is extended or adjusted under 35 U.S.C. 154(b) by 0 days.

(21) Appl. No.: 09/426,459

(22) Filed: Oct. 25, 1999

Related U.S. Application Data

(60) Provisional application No. 60/106,324, filed on Oct. 30, 1998.

(51) Int. Cl.$^7$ .................................................... H02P 5/165
(52) U.S. Cl. ..................... 388/814; 318/586; 318/580; 318/561; 318/254; 318/138; 318/439; 388/806; 388/815
(58) Field of Search ................................... 318/586, 580, 318/561, 254, 138, 439; 388/806, 814, 815

(56) References Cited

U.S. PATENT DOCUMENTS

| | | |
|---|---|---|
| 3,460,013 | 8/1969 | Gaylor . |
| 4,017,045 | 4/1977 | Kirchhein . |
| 4,030,132 * | 6/1977 | Iftikar et al. ........................ 318/616 |
| 4,387,432 | 6/1983 | Fischer et al. . |
| 4,502,109 | 2/1985 | Delmege et al. . |
| 4,577,271 | 3/1986 | Jones et al. . |
| 4,633,404 | 12/1986 | Greeson et al. . |
| 4,733,149 | 3/1988 | Culberson . |
| 4,787,042 | 11/1988 | Burns et al. . |
| 4,797,829 | 1/1989 | Martorella et al. . |
| 4,826,110 | 5/1989 | Le . |
| 4,841,208 | 6/1989 | Itoh . |
| 4,899,284 | 2/1990 | Lewis et al. . |
| 4,969,757 | 11/1990 | Spina . |
| 4,992,713 | 2/1991 | McCollum et al. . |
| 5,325,460 | 6/1994 | Yamada et al. . |
| 5,404,418 | 4/1995 | Nagano . |
| 5,422,555 | 6/1995 | Paige . |
| 5,448,148 | 9/1995 | Devier . |
| 5,670,856 | 9/1997 | Le et al. . |
| 6,034,499 * | 3/2000 | Tranovich ............................ 318/650 |

* cited by examiner

Primary Examiner—Karen Masih
(74) Attorney, Agent, or Firm—Keith Newburry, Esq.

(57) ABSTRACT

In a closed loop control system that governs the movement of an actuator a filter is provided that attenuates the oscillations generated by the actuator when the actuator is at a resonant frequency. The filter is preferably coded into the control system and includes the following steps. Sensing the position of the actuator with an LVDT and sensing the motor position where motor drives the actuator through a gear train. When the actuator is at a resonant frequency, a lag is applied to the LVDT signal and then combined with the motor position signal to form a combined signal in which the oscillation generated by the actuator are attenuated. The control system then controls ion this combined signal. This arrangement prevents the amplified resonance present on the LVDT signal, from causing control instability, while retaining the steady state accuracy associated with the LVDT signal. It is also a characteristic of this arrangement that the signal attenuation will always coincide with the load resonance frequency of the system so that variations in the resonance frequency will not effectuate the effectiveness of the filter.

18 Claims, 2 Drawing Sheets

ANTI-RESONANCE MIXING FILTER

CROSS REFERENCE TO RELATED APPLICATION

Priority is claimed to provisional application serial No. 60/106,324, filed Oct. 30, 1998.

GOVERNMENT RIGHTS

The invention described herein was made in the performance of work under NASA Contract No. NCC8-115 and is subject to the provisions of Section 305 of the National Aeronautics and Space Act of 1958 (42 U.S.C. 2457).

TECHNICAL FIELD

The present invention relates a system and method for filtering feedback signals available in an electromechanical actuation system to mitigate the adverse effects of load resonance on position control loop stability.

BACKGROUND OF THE INVENTION

There are many components of an aircraft that are positioned by electromechanical or pneumatic-mechanical actuation systems. In these systems, an electric or pneumatic motor drives an actuator in response to signals from an electronic control unit. To assure that these aircraft components are accurately and correctly positioned, the control unit needs to know position of the actuator moving the component. To achieve this, highly accurate position sensors are used on the actuators to sense the position of the actuator and provide to the control unit a corresponding signal. One such sensor commonly used is a linear variable displacement transducer, (LVDT).

Because of compliance or resilience in the actuator and in the mounting of the actuator, the actuator will amplify displacement oscillations when operating at its natural or resonant frequency. These amplified oscillations are picked up by high accuracy position sensors like the LVDT. The LVDT feeds the oscillation through the control system and as a result can drive the control system unstable.

Accordingly, a need exists for a filtering system that isolates these oscillations from the control unit and thus allow the use of high accuracy sensors.

SUMMARY OF THE INVENTION

An object of this invention is to provide a filter that isolates oscillations that are amplified when operating at resonant frequencies.

The present invention achieves this object by providing anti-resonant mixing filter and method therefor that is incorporated into a closed loop control system that controls the movement of a structure that amplifies displacement oscillations when operating at a resonant frequency. The method comprises the steps of sensing a first parameter of the structure and generating a first signal thereof, the first parameter being sensitive to the oscillations and sensing a second parameter that is isolated from the oscillations and generating a second signal thereof, there being a known relationship between the first and second parameters. Applying a lag to the first signal and then combining the first and second signals to form a third signal in which the oscillations in the first signal are attenuated This third signal is then used by the control system so that amplified oscillations, at the resonant frequency, cannot feed through the controller to drive the system unstable. In the preferred embodiment, this method is coded into the control system.

These and other objects, features and advantages of the present invention are specifically set forth in or will become apparent from the following detailed description of a preferred embodiment of the invention when read in conjunction with the accompanying drawings.

DESCRIPTION OF THE INVENTION

Figure 1:
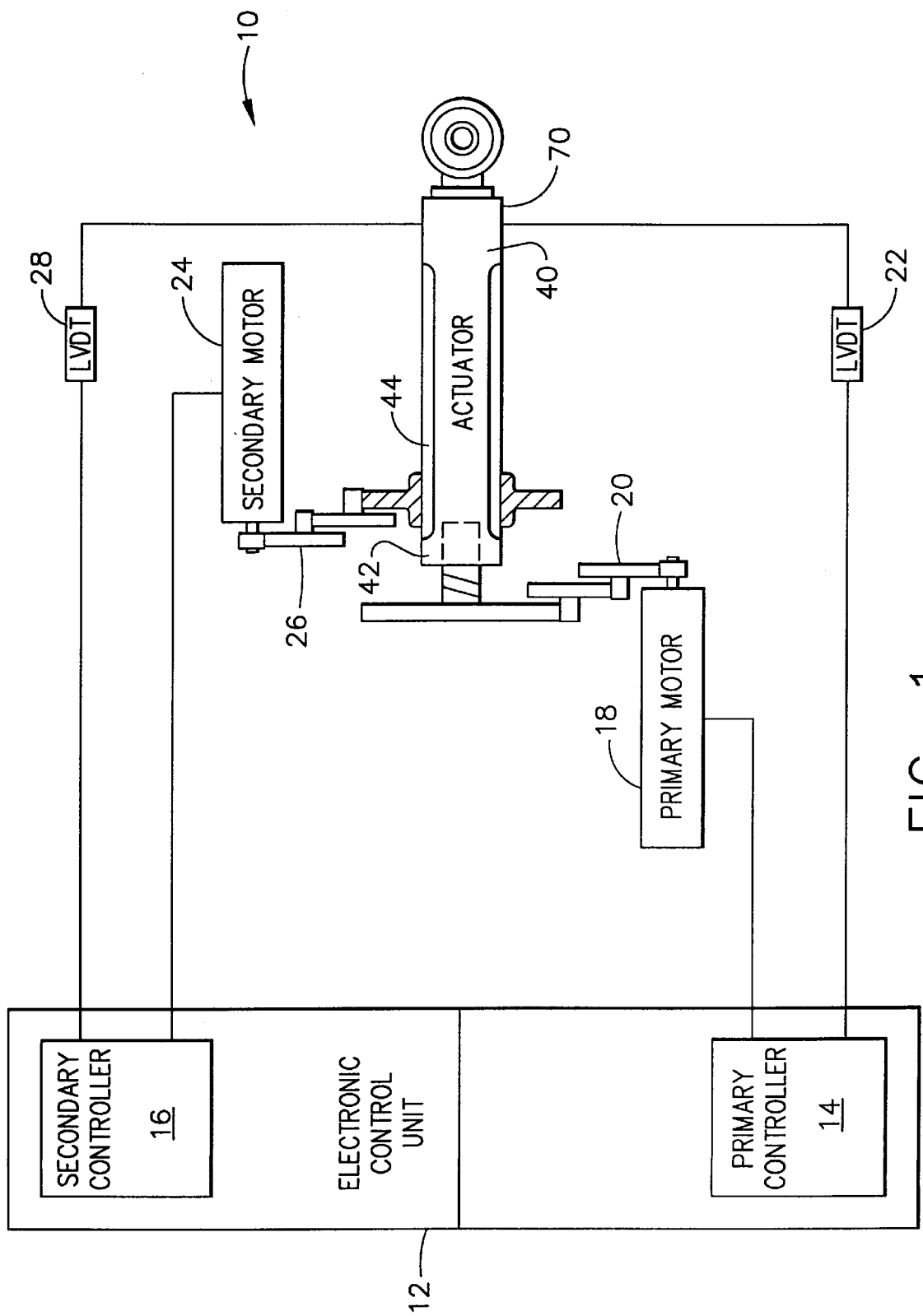
FIG. 1 is a schematic of an electromechanical actuator system employing an anti-resonance filter contemplated by the present invention.

FIG. 1 shows an actuator system 10 having an dual drive actuator 40. The operation of the system 10 is controlled by an electronic control unit 12 which has a primary controller 14 and a secondary controller 16. When movement of a control surface to which the actuator 40 is attached is required, the primary controller 14 sends a signal to a primary electric motor 18 which in turn drives the primary gear train 20. The primary gear train 20 is secured to a support structure, (not shown) and is also coupled to an inner tubular member 42 of the actuator 40. A linear variable displacement transducer (LVDT) 22 measures the linear position of the output tube 70 of the actuator 40 and sends a signal indicative of such position to the primary controller 14, thereby closing the control loop. When the required position of the control surface is reached as sensed by the LVDT, the primary controller 14 stops the movement of the actuator 40. The combination of primary controller 14, primary motor 18, primary gear train 20 and actuator 40 define the primary load path.

In the event of a failure in the primary drive a secondary drive is provided. The secondary drive includes the secondary controller 16 which controls a secondary motor 24 which in turn drives a secondary gear train 26. The secondary gear train 26, like its counterpart, is secured to a support structure, (not shown). The gear train 26 is also coupled to a ball screw nut 44 of the dual drive actuator 40. An LVDT 28 measures the linear position of the output tube 70 of the actuator and sends a signal indicative of such position to the secondary controller 16, thereby closing the control loop. The secondary load path operates in the same control manner as the primary control path described above. When the primary load path is operating the secondary load path is locked.

Because the motors 18, 24 are coupled by gear trains to the actuator 40, there is a known, steady state relationship between the motor's rotational speed or position and the position of the output tube 70. Specifically, in the preferred embodiment the motor position and the actuator position are related by a factor equal to the gear ratio of the particular gear train 20, 26. Also, because the apparent inertia of the motors reflected through the gear train is high, the motor position is not significantly affected by a mechanical resonance at the actuator output. The anti-resonance mixing filter contemplated by the present invention takes advantage of this known relationship.

Figure 2:
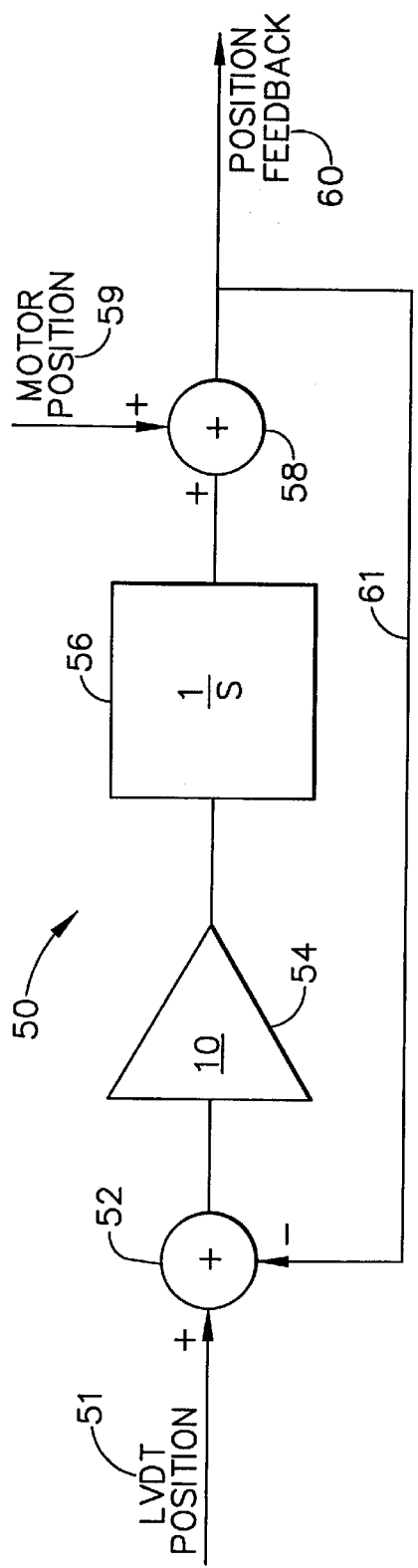
FIG. 2 is a control schematic of the anti-resonance filter contemplated by the present invention.

Referring to FIG. 2, the anti-resonance mixing filter is generally denoted by reference numeral 50 and resides in the controllers 14 and 16. The filter 50 has a summer 52 which receives the position signal 51 from one of the LVDTs 22 or 28. From the summer 52 the position signal is sent to a gain 54 and then to first order lag integrator 56. From the integrator 56 the signal flows to second summer 58. At the summer 58 the signal from the integrator 56 is added to the position signal 59 from the motor to form a position feedback signal 60 which is used by the controller. The motor position signal 59 can be obtained from a motor's commutation signal or from a sensor such as a tachometer. A loop 61 brings the position feedback signal 60 back into summer 52 where it is subtracted from the LVDT position signal 51.

Either both or one of the LVDT position signals 51 and the motor position signal 59 is scaled, in a manner familiar to those skilled in the art, so that their amplitudes are the same in the steady state condition. Thus in steady state condition the integrator 56 is idle because the signal entering the integrator is zeroed out at the summer 52. However, when the LVDT position signal starts oscillating because the actuator 40 is operating at a resonant frequency, the LVDT position signal will no longer be zeroed out at the summer 52. Instead it will be amplified in the gain 54 and then integrated in integrator 56. The integrator 56 imparts a lag to the signal so that it is ninety degrees out of phase with the motor position signal 59 by the time it reaches the summer 58. At summer 58 the position signal 59 cancels the oscillation signal driving the position feedback signal to zero. As a result the controller is isolated from these oscillations. Once the actuator is no longer at a resonant frequency, the oscillations subside and the anti-resonance mixing filter returns to a steady state operation.

Figure 3:
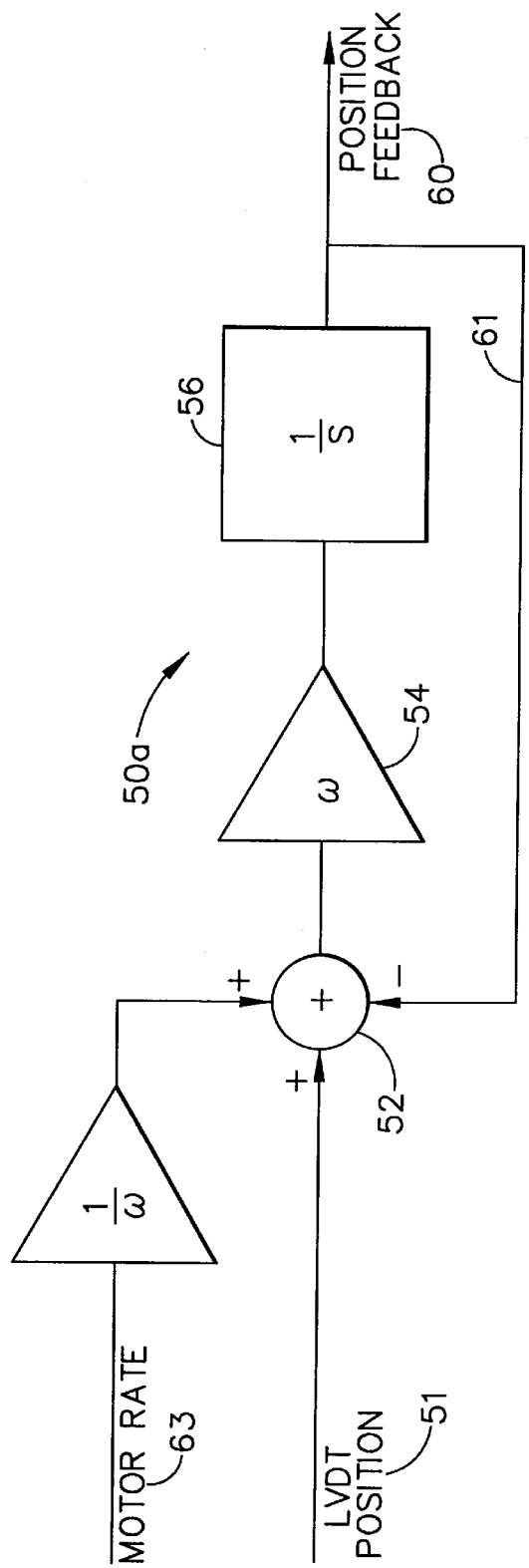
FIG. 3 is a control schematic of an alternative embodiment of the anti-resonance filter contemplated by the present invention.

FIG. 3 shows an alternative embodiment 50a where a motor rate signal 63 is used in place of motor position signal 59. The motor rate signal 63 is divided by the gain of 54 and then summed in summer 52 with the LVDT position signal 51 and position feedback signal 60.

Thus by combining the motor position or motor rate signal, used for motor commutation, with the LVDT signal, a dynamic feedback signal can be constructed that retains the steady state accuracy of the LVDT signal but mitigates the adverse effects of the load resonance peaking that appears on the LVDT signal. As the motor position signal is already available in most cases for use in motor commutation, this approach can be implemented in software with no additional hardware required.

Though the preferred embodiment has been described with respect to analog components, the anti-resonance mixing filter can be implemented in software with code "C" being the preferred language.

Various modifications and alterations to the above-described preferred embodiment will be apparent to those skilled in the art. For example other types of motors such as pneumatic motors can be used in driving the actuator. Also, instead of motor position a signal of motor rotational speed can be used. Accordingly, these descriptions of the invention should be considered exemplary and not as limiting the scope and spirit of the invention as set forth in the following claims.

What is claimed is:

1. In a closed loop control system for controlling the movement of a structure, a method for filtering oscillations generated when said structure is at a resonant frequency comprising the steps of:
    (a) sensing a first parameter of said structure and generating a first signal thereof, said first parameter being sensitive to said oscillations;
    (b) sensing a second parameter that is isolated from said oscillations and generating a second signal thereof, there being a known relationship between said first and second parameters;
    (c) applying a lag to said first signal;
    (d) combining said first and second signal to form a third in which the oscillations in said first signal are attenuated; and
    (e) using said third signal in said control system.

2. The method of claim 1 further comprising between steps (b) and (c) the step of applying a gain to said first signal.

3. The method of claim 2 wherein said structure is an actuator.

4. The method of claim 3 wherein said first parameter is actuator position.

5. The method of claim 4 wherein said second parameter is the rotor position of a motor that is driving said actuator.

6. The method of claim 4 wherein said second parameter is the rotational speed of a motor that is driving said actuator.

7. The method of claim 5 wherein said third signal is a position feedback signal.

8. The method of claim 1 further comprising the step of bypassing step (c) when said structure is not at a resonant frequency.

9. An anti-resonance mixing filter for use in a control system for controlling a first member that is driven by a second member in response to said control system, said first member being subject to oscillations at its resonant frequencies, said filter comprising:
    a first sensor for sensing a first parameter of said first member and generating a first signal thereof, said sensor having a sensitivity so as to pickup said oscillations when said first member is at a resonant frequency;
    a second sensor for sensing a second parameter of said second member and generating a signal thereof;
    said filter further comprising in series:
        a first summer receiving said first signal;
        a gain;
        an integrator;
        a second summer receiving said second signal; and
        a feedback loop between the upstream side of said second summer and said first summer.

10. The filter of claim 9 wherein said first sensor is a linear variable displacement transducer.

11. The filter of claim 9 wherein said first member is an actuator and said second member is a motor.

12. The filter of claim 11 wherein said first parameter is actuator position and said second parameter is motor position.

13. The filter of claim 11 wherein said first parameter is actuator position and said second parameter to motor rotational speed.

14. An anti-resonance mixing filter for use in a control system for controlling a first member that is driven by a second member in response to said control system, said first member being subject to oscillations at its resonant frequencies, said filter comprising:
    means for sensing a first parameter of said first member and generating a first signal thereof, said sensing means having a sensitivity so as to pickup said oscillations when said first member is at a resonant frequency;
    means for sensing a second parameter of said second member and generating a second signal thereof;
    said filter further comprising in series:

means for summing said first signal with a third signal;
means for amplifying the signal from said summing means;
means for integrating the signal from said amplifying means; and
means for summing the signal from said amplifying means
with said second signal to form said third signal.

15. The filter of claim 14 wherein said first sensing means is a linear variable displacement transducer.

16. The filter of claim 14 wherein said first member is an actuator and said second member is a motor.

17. The filter of claim 16 wherein said first parameter is actuator position and said second parameter is motor position.

18. The filter of claim 16 wherein said first parameter is actuator position and said second parameter to motor rotational speed.

* * * * *